United States Patent [19]
Troiani

[11] Patent Number: 5,071,198
[45] Date of Patent: Dec. 10, 1991

[54] EMERGENCY VALVE FOR ABD FREIGHT BRAKE CONTROL VALVE DEVICE

[75] Inventor: Vincent F. Troiani, New Florence, Pa.

[73] Assignee: Westinghouse Air Brake Company, Wilmerding, Pa.

[21] Appl. No.: 643,293

[22] Filed: Jan. 22, 1991

[51] Int. Cl.$^5$ .................................................. B60T 15/30
[52] U.S. Cl. ........................................ 303/37; 303/33; 303/38; 303/41; 303/82
[58] Field of Search ................. 303/33, 36, 37, 38, 303/39, 35, 41, 42, 82, 86, 83, 81, 72-75, 77, 80, 70

[56] References Cited

U.S. PATENT DOCUMENTS

| | | | |
|---|---|---|---|
| 4,690,463 | 9/1987 | Hart | 303/33 X |
| 4,830,438 | 5/1989 | Hart et al. | 303/37 X |
| 4,850,654 | 7/1989 | Hart et al. | 303/33 |

Primary Examiner—Douglas C. Butler
Attorney, Agent, or Firm—G. J. Falce

[57] ABSTRACT

An improved freight brake emergency valve device having improved stability against undesired emergency brake applications, without loss of emergency sensitivity. Flow regulator in the form of a valve and choke combination or a choke itself is employed between the quick action chamber and the chamber normally subject to quick action chamber pressure on the side of the emergency piston opposite brake pipe pressure. This has the effect of momentarily reducing the volume of quick action chamber pressure in order to achieve an intensified pressure reduction in response to initial deflection of the piston member sufficient to counteract a momentary, spurious brake pipe pressure fluctuation.

10 Claims, 2 Drawing Sheets

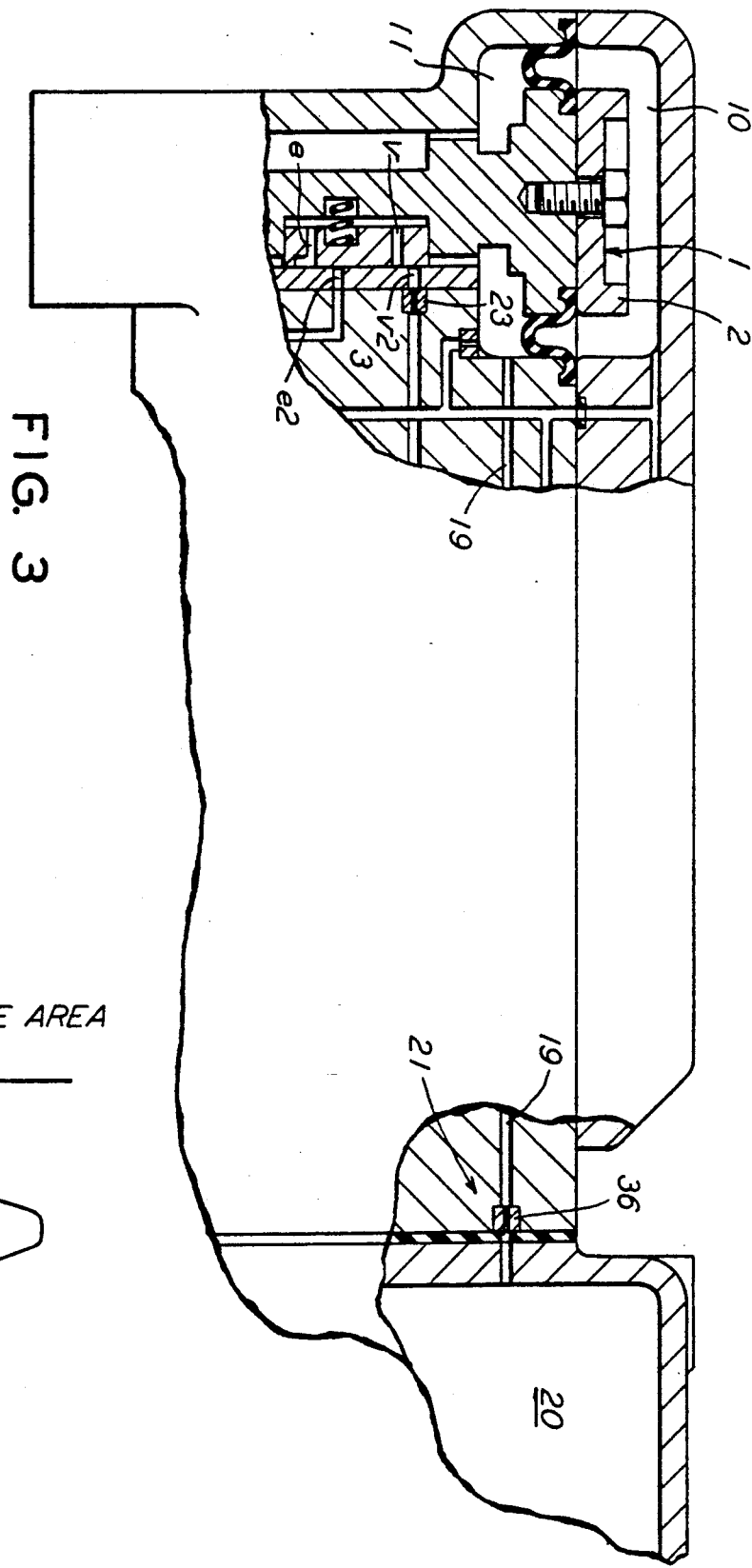

EMERGENCY VALVE FOR ABD FREIGHT BRAKE CONTROL VALVE DEVICE

BACKGROUND OF THE INVENTION

This invention relates to stabilizing a freight brake emergency valve device, particularly against transient pressure fluctuations that are known to cause undesired emergency brake applications, without consequent loss of emergency sensitivity, Undesired emergency brake applications have long been a source of concern to the railroads. An in-depth study of this problem has identified the dynamic effects of slack run-in and run-out as being the main source of pressure transients in the train air line during over-the-road operation. Tests have shown that during slack action, bending of the trainline hose between cars occurs, which produces momentary volumetric changes in the trainline and consequent pressure "spikes" or pulses. In addition, the trainline air mass follows Newton's laws of motion, in that a general pressure drop of approximately 0.4 psi occurs at the rear of a train during slack run-in, with a similar drop in pressure at the head of the train occurring during slack run-out. The magnitude of these pressure fluctuations varies with the intensity of the slack action and other train parameters. When combined with quick service activity during service brake applications, these transient pressure fluctuations may generate a momentary, localized pressure reduction in the trainline at a rate that either exceeds, or so closely approaches an emergency rate, that a particularly sensitive control valve emergency piston may respond to trigger an undesired emergency brake application, as now explained.

The emergency valve in the well-known, industry standard, ABD/ABDW type control valve devices includes a piston having a slide valve that makes a "breather" port connection via which quick action chamber pressure on one side of the emergency piston vents to atmosphere via a "breather" choke, when the trainline brake pipe pressure effective on the opposite side of the emergency piston is reduced. This "breather" choke is selected to establish a maximum rate at which the fixed volume quick action chamber pressure is capable of venting. By setting this rate in accordance with a threshold rate of reduction of brake pipe pressure, above which it is desired to initiate an emergency brake application, a pressure differential is prevented from developing across the emergency piston for a duration of time sufficient to force the emergency piston to emergency position during service rates of reduction of brake pipe pressure. Only when the reduction of brake pipe pressure exceeds and sustains this threshold rate should a pressure differential be developed across the emergency piston sufficient to force the emergency piston to application position, to initiate an emergency brake application.

BRIEF EXPLANATION OF THE DRAWINGS

The problem in the prior art and the invention that overcomes this problem will now be explained with reference to the drawings in which:

FIG. 2 is a graph plotting breather orifice area at the emergency piston slide valve/seat interface as a function of the emergency piston travel in the emergency valve of FIG. 1; and FIG. 3 is a partial sectional diagrammatic view showing an alternate embodiment of the invention

PROBLEM IN THE PRIOR ART

Figure 1:
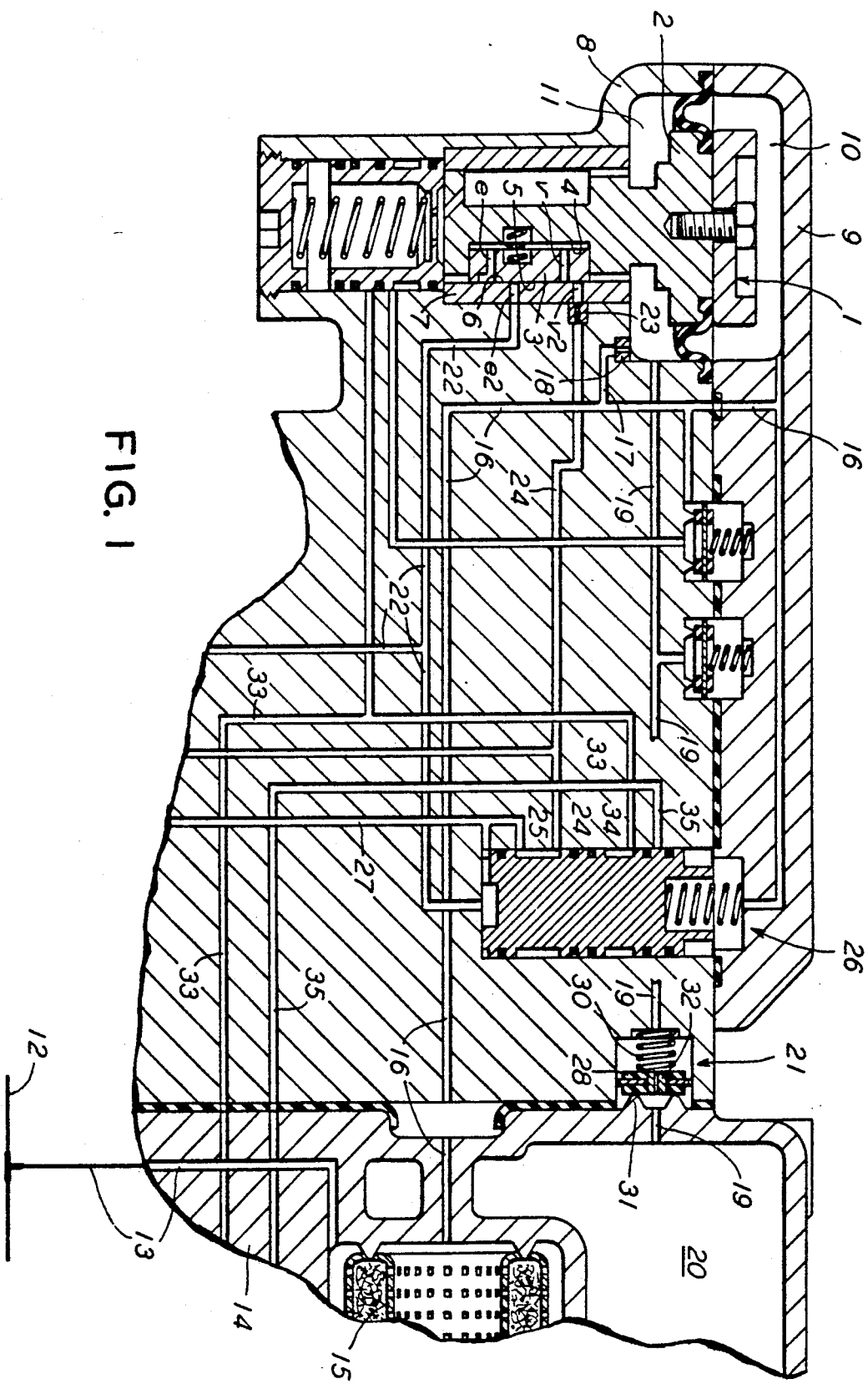
FIG. 1 is a partial sectional diagrammatic view showing an ABD type freight brake control valve device modified in accordance with one embodiment of the present invention.

Well-known ABD type freight brake control valve devices typically employ, in the emergency portion thereof, an emergency valve 1, as shown in FIG. 1. Emergency valve 1 includes a diaphragm piston member 2 having a slide valve 3 carried in a recess 4 in which the slide valve is axially fixed. A planar face 5 of slide valve 3 is spring biased into sealing engagement with the conforming face 6 of a bushing 7 that serves as the slide valve seat.

Piston member 2 is disposed in a cavity of the emergency portion body 8, the cavity being closed by a cover 9 that clamps the piston diaphragm in place, such as to form upper and lower chambers 10,11 on opposite sides of the piston member. A trainline brake pipe 12 is connected by a branch pipe and passage 13, at the control valve pipe bracket 14 on which the emergency portion is mounted, to chamber 10 via a filter 15 and a passage 16. Chamber 11 is connected to passage 16 via a branch passage 17 and a charging choke 18. Another passage 19 connects chamber 11 to a quick action chamber volume 20 in pipe bracket 14. This passage 19 in the known ABD type freight brake control valve device is connected directly to quick action chamber volume 20 and is therefore absent flow regulator 21 shown in FIG. 1, this flow regulator constituting one embodiment of the present invention that will hereinafter be explained.

A port v in slide valve 3 interfaces with a port v2 in the slide valve bushing 7 as piston member 2 moves axially in an upward direction from a release position, as shown, toward application position, in which piston member 2 engages cover 9. Intermediate release and application positions, a variable orifice area is established at the v/v2 interface to provide the aforementioned "breather" port connection within a range of piston travel hereinafter referred to as the "breathing" zone.

Another port e in slide valve 3 is arranged to interface with a port e2 in the slide valve bushing 7 when piston member 2 is in application position. Port e2 is connected by a passage 22 to the underside of high pressure valve 26 and to a vent valve device (not shown). Another passage 33 is connected from a brake cylinder device (not shown) to an annular groove 34 of high pressure valve 26. A passage 35 is connected from an emergency reservoir (not shown) to high pressure valve 26 where it is cut off from passage 33 in the position shown and connected therewith via groove 34 in the actuated position of high pressure valve 26.

As shown in the graph of FIG. 2, the orifice area of this v/v2 port connection gradually increases with piston movement from point (a) to point (b') and decreases as piston 2 moves from point (c') to point (d). Point Y in the graph of FIG. 2 represents the orifice area of a breather choke 23, which is located in a passage 24 that leads to atmosphere via an annular groove 25 of the high pressure valve 26 and a passage 27, in the high pressure valve position shown.

It will be apparent from the graph that the effective orifice area of the v/v2 porting corresponds with the fixed orifice area of "breather" choke 23 when piston travel reaches point (b), being less than the orifice area of "breather" choke 23 between points (a) and (b), and greater between points (b) and (c). In the range of piston travel between points (b) and (c), "breather" choke 23 is effective in conjunction with the v/v2 orifice area to limit the aforementioned maximum rate at which the quick action chamber pressure can vent or "breathe", this range of travel being commonly referred to as a maximum "breathing" range.

During piston movement beyond point (c') to point (d), the area of the v/v2 porting interface diminishes as port v moves out of communication with port v2 until at point (d), complete cut-off of the venting or "breathing" of quick action chamber pressure occurs. This range of travel of the emergency piston between points (a) and (d) corresponds to the aforementioned "breathing" zone that lies intermediate release position and application position of the emergency piston.

Since the orifice areas of the v/v2 port connection and "breather" choke 23 are in series between the quick action chamber and atmosphere, the venting or "breathing" of quick action chamber pressure is nearly always influenced by this restriction of both orifices. It will be appreciated, therefore, that the actual "breathing" rate of quick action chamber pressure only approximate the curve of FIG. 2.

Movement of emergency piston 2 into the "breathing" zone, in response to a pressure differential created by a reduction in brake pipe pressure effective in chamber 10 relative to quick action chamber pressure effective in chamber 11 acting on opposite sides of piston member 2, is intended to vent quick action chamber pressure in chamber 11 at a "breathing" rate sufficient to counteract the reduction of brake pipe pressure in chamber 10 and thereby overcome the pressure differential initiating piston movement to accordingly stabilize the emergency piston, provided the reduction of brake pipe pressure is at a service rate. If the service reduction of brake pipe pressure is at the maximum service rate, the emergency piston will find a position generally in the maximum "breathing" range between points (b) and (c), in which the resultant venting of quick action chamber pressure will counteract the reduction of brake pipe pressure and thereby stabilize the emergency piston. On the other hand, brake pipe pressure reductions at rates less than the maximum service rate will create a lower initial pressure differential to initiate movement of the emergency piston, and the emergency piston will accordingly find a position in the "breathing" zone between points (a) and (b), where the quick action chamber pressure is vented at a less than maximum "breathing" rate, depending upon the degree of v/v2 interface opening. During this stabilization of the emergency piston during service brake applications, it will be understood that the emergency piston may cycle within the "breathing" zone until it finds the proper position in which the "breathing" of the quick action chamber pressure balances the brake pipe pressure reduction sufficiently to stabilize the piston. It will also be understood that in the event the emergency piston moves beyond point (c), the v/v2 interface opening begins to gradually close, as port v in the slide valve moves past port v2 in the slide valve bushing seat, thereby tending to decrease the venting of quick action chamber pressure. Accordingly, the pressure differential across the emergency piston effecting its movement may not be reversed, but rather may increase due to the decreased rate of venting of the quick action chamber pressure, thereby forcing the emergency piston to application position to accordingly initiate an emergency brake application, in a well known manner. While this is the intended response to a sustained emergency rate of reduction of brake pipe pressure, a momentary transient pressure fluctuation at an emergency rate during a service brake application can cause an unintended emergency brake application, particularly if such a spurious pressure fluctuation should occur concurrently with quick service activity.

The pressure differential force across piston 2 required to overcome static friction and initiate piston movement from its release position into the "breathing" zone is greater than the force required to maintain continued movement of the piston against dynamic friction. Accordingly, a relatively high initial differential force across piston 2, due to a relatively high service rate of brake pipe reduction, can develop sufficient piston momentum to cause piston 2 to tend to overshoot the maximum "breathing" zone between points (b) and (c). Since the quick action chamber pressure is vented at a progressively reduced rate beyond the maximum "breathing" zone, i.e. between points (c) and (d), as above explained, it will be understood that a critical condition exists with respect to the possibility of a spurious brake pipe pressure fluctuation occurring at this particular point in time.

Normally, piston movement will be halted in the "breathing" zone between points (a) and (c) and will hunt or cycle to find the precise position in which the quick action chamber pressure can "breathe" at a rate corresponding to the specific service reduction rate of brake pipe pressure effective at any particular control valve device, thereby stabilizing the piston against further movement beyond point (c) defining the limit of the maximum "breathing" range. However, if a spurious brake pipe pressure fluctuation should occur prior to piston movement being halted, the piston momentum coupled with the momentary high pressure differential across the piston, due to the pressure fluctuation, can cause the piston to overshoot the maximum "breathing" range (b-c) within the "breathing" zone, before the pressure fluctuation dissipates. The resultant movement of emergency piston beyond point (c) defining the limit of the maximum "breathing" range results in progressively reduced "breathing" of quick action chamber pressure, due to the reduced orifice area of the v/v2 porting interface, with consequent loss of the emergency piston stability. When this occurs, the emergency piston will continue to move to application position and thereby produce an unintended emergency brake application.

OBJECTS OF THE INVENTION

The object of the present invention is to provide emergency stability against spurious, short term, high rate fluctuations of trainline brake pipe pressure, without loss of sensitivity to a sustained true emergency rate of brake pipe pressure reduction.

An extension of the foregoing objective is to reduce the effective volume of quick action chamber pressure to which the emergency piston is subject during initial brake pipe pressure reductions, thereby momentarily desensitizing the emergency piston.

SUMMARY OF THE INVENTION

Briefly, these objectives are achieved in a railway car control valve device to which a fluid pressure charged brake pipe is connected. The control valve device comprises an emergency piston, a first chamber formed on one side of the emergency piston to which fluid under pressure is connected from the brake pipe, a quick action chamber communicated with the second chamber, the emergency piston being movable from a release position toward an application position in response to a pressure differential being established thereacross due to a reduction in brake pipe pressure, valve means operative in response to movement of the emergency piston in a "breathing" zone intermediate the release and application positions for establishing a fluid flow path via which fluid under pressure is vented from the second chamber and quick action chamber, a "breather" choke in the fluid flow path via which the rate of venting the second chamber and quick action chamber is controlled so as to counteract the pressure differential and thereby prevent the emergency piston from moving to application position except when the reduction of brake pipe pressure exceeds a predetermined service rate, and fluid flow regulating means intermediate the second chamber and quick action chamber for momentarily preventing development of a pressure differential sufficient to effect movement of the emergency piston to application position when the reduction of brake pipe pressure exceeds a service rate.

DESCRIPTION AND OPERATION

In the embodiment of the invention shown in FIG. 1, flow regulator 21 includes a disc valve element 28 that is biased by a spring 30 toward engagement with an annular valve seat 31 surrounding passage 19. A choke 32 is provided in disc valve element 29 to provide a limited flow communication between chamber 11 and quick action chamber 20 during closure of valve element 28. The size of choke 32 is selected such that the flow capacity provided thereby is less than the flow capacity via "breather" choke 23.

During system charging, air flows from brake pipe 12 to chamber 10 above piston member 2 via pipe and passage 13, filter 15, and passage 16. At the same time, air also flows from passage 16 to chamber 11 under piston member 2 via passage 17 and charging choke 18 at a reduced rate. The resultant predominance of pressure in chamber 10 creates a downward acting pressure differential across piston member 2 to locate the piston in its release position, as shown. Air also flows from chamber 11 to quick action chamber 20 via passage 19 and choke 32 in one-way check valve 28, the latter being closed against flow in this direction.

When a brake application is initiated, the pressure of air carried in brake pipe 12 is reduced at a predetermined rate, this reduction of pressure being reflected in chamber 10 at a faster rate than in chamber 11, due to the restriction of charging choke 18. Consequently, an upward acting pressure differential develops across piston member 2, forcing the piston toward application position.

During initial upward movement of piston member 2, valve element 28 is closed, so that flow of fluid pressure is cut off between chamber 22 and quick action chamber 20, except for the restricted flow via choke 32. This effectively limits the volume of chamber 11, so that a more pronounced pressure drop can be realized therein, in response to the above-discussed "breathing" action of the emergency piston, and also during piston displacement. Only when the pressure drop in chamber 11 is sufficient to create a pressure differential between chambers 11 and 20 greater than the closure force exerted on valve element 28 by bias spring 30 will valve element 28 be unseated and thereby restore full volumetric capacity to chamber 11.

During service reductions of brake pipe pressure, upward displacement of piston member 2 will be sufficiently slow that choke 32 can satisfy the flow demand due to the pressure drop that occurs because of the resultant volumetric gain in chamber 11 created by such piston displacement. Accordingly, insufficient differential is developed across check valve 28 to overcome bias spring 30, and valve element 28 therefore remains seated. Piston member 2 will find a position in the "breathing" zone in which the v/v2 port opening is such that the pressure effective in chamber 11 acting on the underside of piston member 2 is reduced at the same rate as the brake pipe pressure reduction effective in chamber 10 on the opposite side of piston member 2. In this manner, the service reduction of brake pipe pressure will be incapable of developing a pressure differential across piston member 2 sufficient to force the piston member to application position and the emergency piston is thus stabilized against emergency application during service reductions of brake pipe pressure.

In the event a spurious, high level, transient fluctuation of brake pipe pressure should occur during a service brake application, such as contributes to undesired emergency brake applications, a relatively high pressure differential will quickly develop across piston member 2, which will tend to deflect piston member 2 in an upward direction toward application position. Due to the fact that valve element 28 is closed, however, the volumetric pressure to which piston member 2 is subject on its underside is limited to the pressure in chamber 11. This has a distinct advantage over the prior art in producing a faster pressure drop in chamber 11 to counteract the pressure fluctuation effective in chamber 10, thereby preventing the piston member 2 from being inappropriately forced to application position in response to a spurious brake pipe pressure fluctuation. Achieving such a rapid pressure drop in chamber 11 sufficiently fast to counteract a high rate fluctuation is attributed to the fact that pressure in the limited volume of chamber 11 responds more rapidly to such factors as influence pressure than it does when combined through the enlarged volume of both chamber 11 and chamber 20, as in the prior art. Consequently, the effect of the "breathing" action on pressure in chamber 11 also produces a faster pressure drop therein during this initial upward deflection of piston member 2, in addition to the pressure drop in chamber 11, due to piston displacement, being greater for a given distance of travel than in the prior art.

It will be appreciated that these factors combined produce a pressure drop in chamber 11 at a rate capable of preventing a pressure differential from developing between chambers 10 and 11 sufficient to drive piston member 2 to application position, and the emergency piston is thus stabilized against spurious, high rate, short term pressure fluctuations arising in brake pipe 13.

Since the pressure drop in chamber 11 is initially relatively fast in response to piston deflection in the face of a pressure fluctuation in brake pipe 13, as explained, conceivably a pressure differential will develop across valve element 28 sufficient to force the valve element off of its seat 31 against the force of bias spring 30. While this will have the effect of diminishing the intensity of the "breathing" action initially realized, due to the fact that the "breathing" pressure will be fed from the total volume of chambers 11 and 20 following unseating of valve element 28, any short term pressure fluctuation in brake pipe 13 will already have been dissipated, and piston member 2 will again find a position in which the v/v2 port communication will establish "breathing" of pressure in chamber 11 at a rate consistent with a service rate of brake pipe pressure reduction effective at chamber 10.

While the foregoing discussion is in accordance with brake pipe pressure fluctuations occurring at the time a service brake application is in effect, it will be appreciated that a similar action will occur in the event a brake pipe pressure fluctuation occurs when the brakes are in a release condition.

In the event a sustained emergency rate of reduction of brake pipe pressure occurs, indicative of an actual emergency brake application, as opposed to a short term reduction at an emergency rate, due to a spurious pressure fluctuation, a relatively deep pressure drop will initially develop in chamber 11 to momentarily offset the pressure drop in chamber 10. As previously explained, this deep pressure drop in chamber 11 will develop as a result of the limited volume of chamber 11 due to closure of valve element 28. Once this pressure drop in chamber 11 becomes deep enough to cause a pressure differential sufficient to unseat valve element 28, chambers 11 and 20 will, in effect, become a single volumetric entity. Consequently, the initial fast rate of reduction of pressure in chamber 11 via ports v/v2 and "breather" choke 32 is considerably slowed, so that a sustained emergency rate of reduction of pressure effective in chamber 10 is no longer able to be counteracted and sufficient differential is accordingly developed across piston member 2 to deflect it to application position.

In application position, piston member 2 is forced upwardly until it engages a stop provided by cover 9. In this position, slide valve 3 is positioned such that port v is shifted to the opposite side of port v2 from the position shown in FIG. 1, thereby cutting off the v/v2 port connection and terminating "breathing" or venting of pressure effective in chamber 11. At the same time, port e in slide valve 3 is aligned with bushing port e2 to connect pressure in chamber 11 to passage 22 leading to the underside of high pressure valve 26 and to a vent valve device (not shown). As is well known, high pressure valve 26 is accordingly actuated to connect emergency reservoir pressure in passage 35 to passage 33 leading to the car brake cylinder(s) (also not shown). As is also well known, the vent valve device is actuated concurrently with actuation of high pressure valve 26, to locally vent brake pipe pressure and thereby propagate a quick action wave of brake pipe pressure serially through the brake pipe 12 to an adjacent car.

During actuation of high pressure valve 26, the pilot pressure acting on its underside is vented via passage 27 and a blowdown choke (not shown). Since this pilot pressure is supplied from quick action chamber 20 via valve element 28, passage 19, chamber 11, slide valve port e, bushing port e2 and passage 22, reset of the high pressure valve is delayed in a well known manner following an emergency application to prevent the brake application from being released for a predetermined period of time.

In the alternate embodiment of the invention shown in FIG. 2, the flow regulator 21 is provided by a choke 36 in passage 19, instead of combined valve element 28 and choke 32. Since this choke 36 is fixed in passage 19 (as opposed to the location of choke 32 of valve element 28 being determined by whether or not valve element 28 is engaged with seat 31) the flow capacity provided by choke 36 must be greater than the flow capacity provided by "breather" choke 23, so as to not influence the rate at which pressure in chamber 11 is reduced via "breathing" choke 23 when the v/v2 port connection is established in the "breathing" zone. In this sense, choke 36 does not effectively isolate chamber 11 from quick action chamber 20 and therefore the effective pressure in chamber 11 during "breathing" action is determined by the combined volume of these chambers 11 and 20. Accordingly, the impact of the "breathing" action in producing a pressure drop in chamber 11 in this alternate embodiment of the invention is not as pronounced as in the embodiment of FIG. 1. However, displacement of piston member 2 does have a pronounced impact in effecting a momentary, high rate pressure reduction in chamber 11, due to the fact that the flow capacity of choke 36 is insufficient to satisfy the instantaneous demand created by the volumetric expansion of chamber 11, when such displacement of piston member 2 occurs.

In thus creating a rapid drop in the pressure of chamber 11, continued upward displacement of piston member 2, in response to a short term, high rate, brake pipe pressure fluctuation effective in chamber 10, is halted prior to piston member 2 being shifted beyond the limit of the "breathing" range, defined by point c in the graph of FIG. 2, and the occasion of an undesired emergency brake application is accordingly prevented.

This rapid pressure drop in chamber 11 in response to initial upward deflection of piston member 2 is only momentary, the size of choke 36 being selected to dissipate the pressure drop in chamber 11, after a relatively brief period of time, by providing pressure flow between chamber 11 and quick action chamber 20 at a controlled rate. It will be appreciated, therefore, that in the event of an emergency brake application, in which case the brake pipe pressure reduction effective in chamber 10 is not momentary, as during a brake pipe pressure fluctuation, but rather is sustained, the continued reduction of brake pipe pressure at an emergency rate will occur at a greater rate than the maximum rate at which pressure effective in chamber 11 can be reduced via "breather" choke 23. Accordingly, an upward acting pressure differential will develop across piston member 2, such that piston member 2 will not be halted, but will continue to move to application position to provide an emergency brake application, as explained with respect to the embodiment of the invention shown in FIG. 1.

I claim:

1. A railway car emergency valve device, to which a fluid pressure charged brake pipe is connected, comprising:
    (a) an emergency piston;
    (b) a first chamber formed on one side of said emergency piston to which fluid under pressure is connected from said brake pipe;
    (c) a second chamber formed on the opposite side of said emergency piston to which fluid under pressure is connected from said brake pipe via a first charging choke;
    (d) a quick action chamber communicated with said second chamber;
    (e) said emergency piston being movable from a release position toward an application position in response to a pressure differential being established between said first and second chambers due to a reduction of said brake pipe fluid pressure;

(f) valve means operative in response to movement said emergency piston in a "breathing" zone intermediate said release and application positions for establishing a fluid flow path via which fluid under pressure is vented from said second chamber and said quick action chamber; and (g) a "breather" choke in said fluid flow path via which the rate of venting said second chamber and said quick action chamber is controlled so as to counteract said pressure differential and thereby prevent said emergency piston from moving to said application position except when said reduction of said brake pipe fluid pressure exceeds a predetermined service rate; wherein the invention is characterized by:

(h) fluid flow regulator means intermediate said second chamber and said quick action chamber for momentarily preventing said pressure differential from developing sufficiently to effect said movement of said piston to said application position when said reduction of said brake pipe fluid pressure exceeds said service rate.

2. An emergency valve device, as recited in claim 1, wherein said fluid flow regulator means comprises:
(a) a disc valve element; and
(b) an annular valve seat with which said disc valve element is engageable.

3. An emergency valve device, as recited in claim 2, wherein said flow regulator means further comprises bias means for effecting engagement of said valve element with said valve seat until a predetermined pressure differential is established between said second chamber and said quick action chamber.

4. An emergency valve device, as recited in claim 3, wherein said engagement of said valve element with said valve seat is in the direction of flow of fluid under pressure from said second chamber toward said quick action chamber.

5. An emergency valve device, as recited in claim 4, wherein said flow regulator means further includes a second charging choke via which a restricted backflow of fluid under pressure can occur during said engagement of said valve element with said valve seat.

6. An emergency valve device, as recited in claim 5, wherein said second charging choke and said "breather" choke are in series.

7. An emergency valve device, as recited in claim 6, wherein the size of said second charging choke is selected such that the flow capacity provided thereby is less than the flow capacity via said "breather" choke.

8. An emergency valve device, as recited in claim 1, wherein said fluid flow regulator means comprises a delay choke.

9. An emergency valve device, as recited in claim 8, wherein said delay choke and said "breather" choke are in series.

10. An emergency valve device, as recited in claim 9, wherein the flow capacity provided by said delay choke is greater than the flow capacity via said "breather" choke.

* * * * *